United States Patent [19]

Joy et al.

[11] Patent Number: 4,912,663

[45] Date of Patent: Mar. 27, 1990

[54] SONIC DIGITIZER COIL MEASUREMENT SYSTEM

[75] Inventors: Bruce E. Joy, North Huntingdon Twp., Westmoreland County; Kenneth S. Gerkey, Mt. Lebanon; Bruce K. Salmond, Upper St. Clair; Larry J. Appolonia, Carroll Twp., Washington County, all of Pa.

[73] Assignee: Westinghouse Electric Corp., Pittsburgh, Pa.

[21] Appl. No.: 163,352

[22] Filed: Mar. 2, 1988

[51] Int. Cl.⁴ ............................................. G06F 15/20
[52] U.S. Cl. .................................. 364/560; 369/129; 369/127
[58] Field of Search ............... 364/560, 561, 709.11, 364/705.03, 460, 559; 367/907, 129, 127, 122, 119, 105; 178/18; 33/1 P; 73/625

[56] References Cited

U.S. PATENT DOCUMENTS

| | | | |
|---|---|---|---|
| 3,176,263 | 3/1965 | Douglas | 367/127 |
| 3,626,483 | 7/1969 | Whetstone . | |
| 3,731,273 | 5/1973 | Hunt | 178/18 |
| 3,918,025 | 11/1975 | Koshikawa et al. | 367/7 |
| 3,981,184 | 9/1976 | Matay . | |
| 3,985,024 | 10/1976 | Horak | 367/907 |
| 4,012,588 | 3/1977 | Davis et al. | 367/127 |
| 4,122,525 | 10/1978 | Eaton | 364/560 |
| 4,124,838 | 11/1978 | Kiss | 367/99 |
| 4,209,853 | 6/1980 | Hyatt | 367/8 |
| 4,235,111 | 11/1980 | Hassler | 73/626 |
| 4,332,016 | 5/1982 | Berntsen | 367/7 |
| 4,357,672 | 11/1982 | Howells et al. | 364/561 |
| 4,528,651 | 7/1985 | Brock et al. | 367/107 |
| 4,571,697 | 2/1986 | Watanabe | 364/561 |
| 4,668,094 | 5/1987 | Matsumoto et al. | 356/376 |
| 4,686,639 | 8/1987 | Johnson et al. | 364/559 |
| 4,688,430 | 8/1987 | Anderson | 73/625 |

FOREIGN PATENT DOCUMENTS

| | | | |
|---|---|---|---|
| 0061826 | 4/1985 | Japan | 364/709.11 |
| 1587712 | 4/1981 | United Kingdom | 367/907 |

OTHER PUBLICATIONS

Science Accessories Corporation Model GP-8-3D Operator's Manual, 3/85, Southport, CT.
Science Accessories Corporation Model GP-8-3D brochure, 12/84.
R. S. Young et al., "Digitally Controlled Ultrasonics for Testing Steel on Line", *Non-Destructive Testing*, Jun. 1976, pp. 131-135.

Primary Examiner—Parshotam S. Lall
Assistant Examiner—S. A. Melnick

[57] ABSTRACT

A three-dimensional measurement system for measuring stator half coils includes a sonic digitizer which makes measurements of the stator half coil. These measurements are provided to a computing apparatus which converts the measured points to corresponding surface points on the surface of the stator half coil and combines the surface points into a measured shape. The measured shape is displayed on a display unit overlayed on the designed shape of the stator half coil for visual comparison of the two shapes. Preferably, the display is in color with different colors used for edges of the measured and designed shapes.

22 Claims, 6 Drawing Sheets

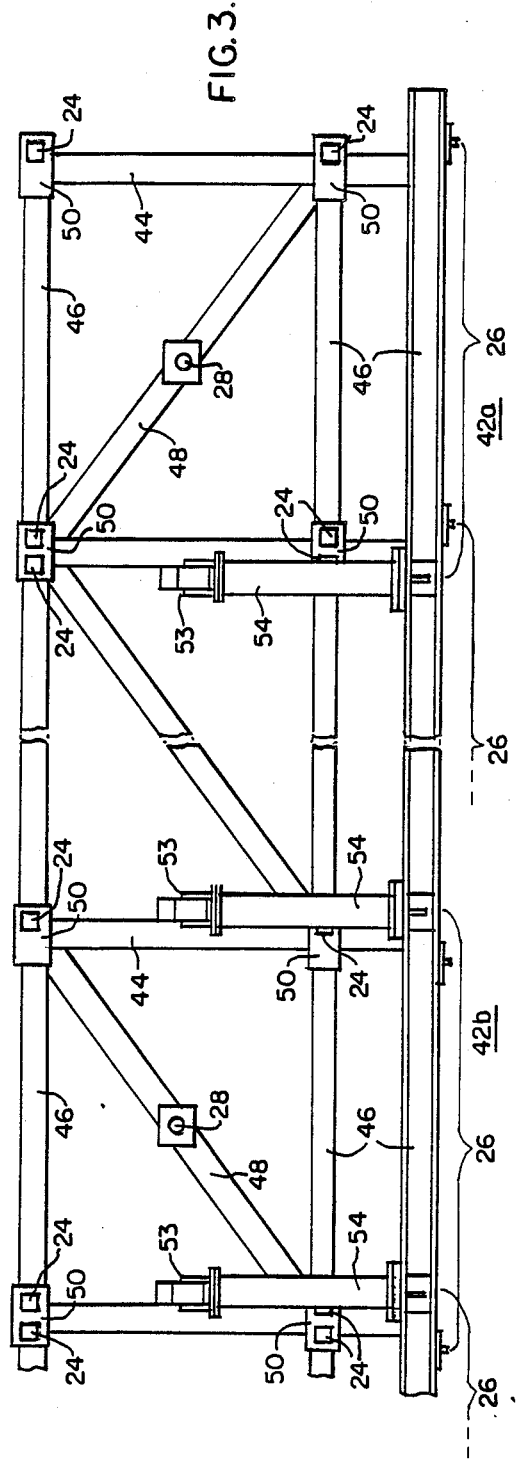
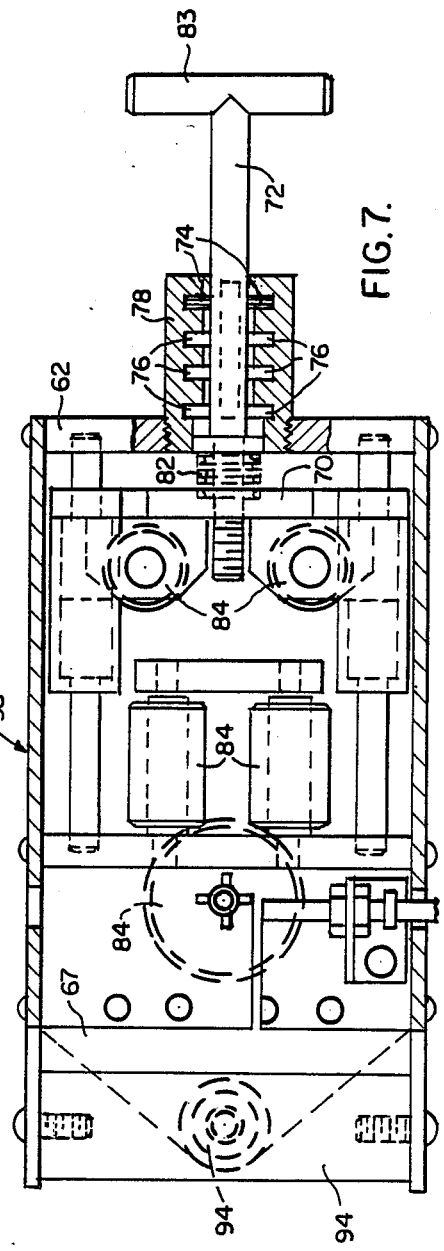

SONIC DIGITIZER COIL MEASUREMENT SYSTEM

BACKGROUND OF THE INVENTION

1. Field of the Invention

The present invention is related to three-dimensional measurement of an object with varying dimensions in all three directions and, more particularly, to a system for measuring stator half coils and full coils.

2. Description of the Related Art

Electrical generators used to produced electricity in power plants have stator coils formed, by two "half coils". Each half coil may be as 36 feet in a large generator. The stator half coils typically have a rectangular cross-section and are formed of stacks of thin metal strips covered with insulation surrounded by tape spirally wound on the coil. The central section of a stator half coil comprises the majority of its length and is straight. However, the end sections of a stator half coil form a complex curve, part of which is shaped like an involute on the inside of a cone. An example of the end section 10 of a conventional stator half coil 11 is illustrated in FIG. 1. As indicated at 12, the stator coil has a rectangular cross-section and the complex curvature of the stator coil end 10 can be seen in the perspective view of FIG. 1.

It is important to manufacture stator half coils so that their actual or measured shape matches the designed shape within relatively close tolerances. The ends 14 of the straight section 16 should align within 0.04 cm (0.15 inch) and the tips 18 of the curved section should be within 0.95 cm (0.375 inch), so that the generator can be assembled with proper clearances and the half coils can be connected to form full coils. However, due to considerable variance in the length, thickness and the shape of the curved end sections 10 of stator half coils, precise measurement of the end sections 10 is difficult and time consuming. Therefore, the position of the tip 18 relative to the end 14 of the straight section 16 is all that is conventionally measured. This makes connectability of half coils to form a full coil reasonably certain; however, the curvature of the end section 10 remains unknown. If the curvature is incorrect, the proper clearances will not be provided. This could result in preventing connection of the half coils until the end section 10 is reformed after installation of the half coils into a partially constructed generator has already begun. Such trial and error construction of stator coils is highly undesirable.

SUMMARY OF THE INVENTION

An object of the present invention is to provide a system for measuring an object of undefined shape in three dimensions, quickly and easily.

A further object of the present invention is to provide quick, precise measurement of an object in a factory environment of noise and vibration.

Another object of the present invention is to provide a measurement system for stator half coils which ensures connectability and proper clearances when the stator half coils are assembled in an electrical generator.

The above objects are attained by providing a method for measuring an object in three dimensions, comprising the steps of: arranging microphones in banks on a single plane; emitting sounds from different emission points corresponding to surface points on the object, each of the emission points being a known distance from a surface of the object; activating one of the banks of the microphones at a time; determining when the sounds are emitted at each of the emission points; and calculating relative positions of the surface points on the object in dependence upon periods of time between the emitting of the sounds and receipt of the sounds by the activated bank of the microphones.

The invention may be embodied by an apparatus for three-dimensional measurement of an object having a designed shape, comprising: three-dimensional measurement means for locating measured points corresponding to surface points on the surface of the object, a computing apparatus for converting the measured points into the surface points to define a measured shape of the object and display means for simultaneously displaying the designed and measured shape of the objects. Preferably, the present invention includes overlaying the designed and measured shapes of the object for visual comparison.

When a stator half coil is measured by a system according to the present invention, the microphones are preferably mounted on a supporting structure having mounting surfaces aligned on a single plane, the microphones being arranged in banks of four at the corners of rectangles, each of the rectangles defined by the microphones overlapping at least one other of the rectangles. The apparatus preferably includes means for generating the sounds at a common position approximately equidistant from two overlapping rectangles defined by eight of the microphones, while the microphones defining one of the two overlapping rectangles are activated and then activating the microphones defining the other of the two overlapping rectangles and generating the sounds again at the common position.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 3 is a front view of a support structure used in the embodiment illustrated in FIG. 2;

FIGS. 6 and 7 are partial cross-sectional side and top views, respectively, of a sound emitter assembly used in the illustrated embodiment.

DESCRIPTION OF THE PREFERRED EMBODIMENT

Figure 2:
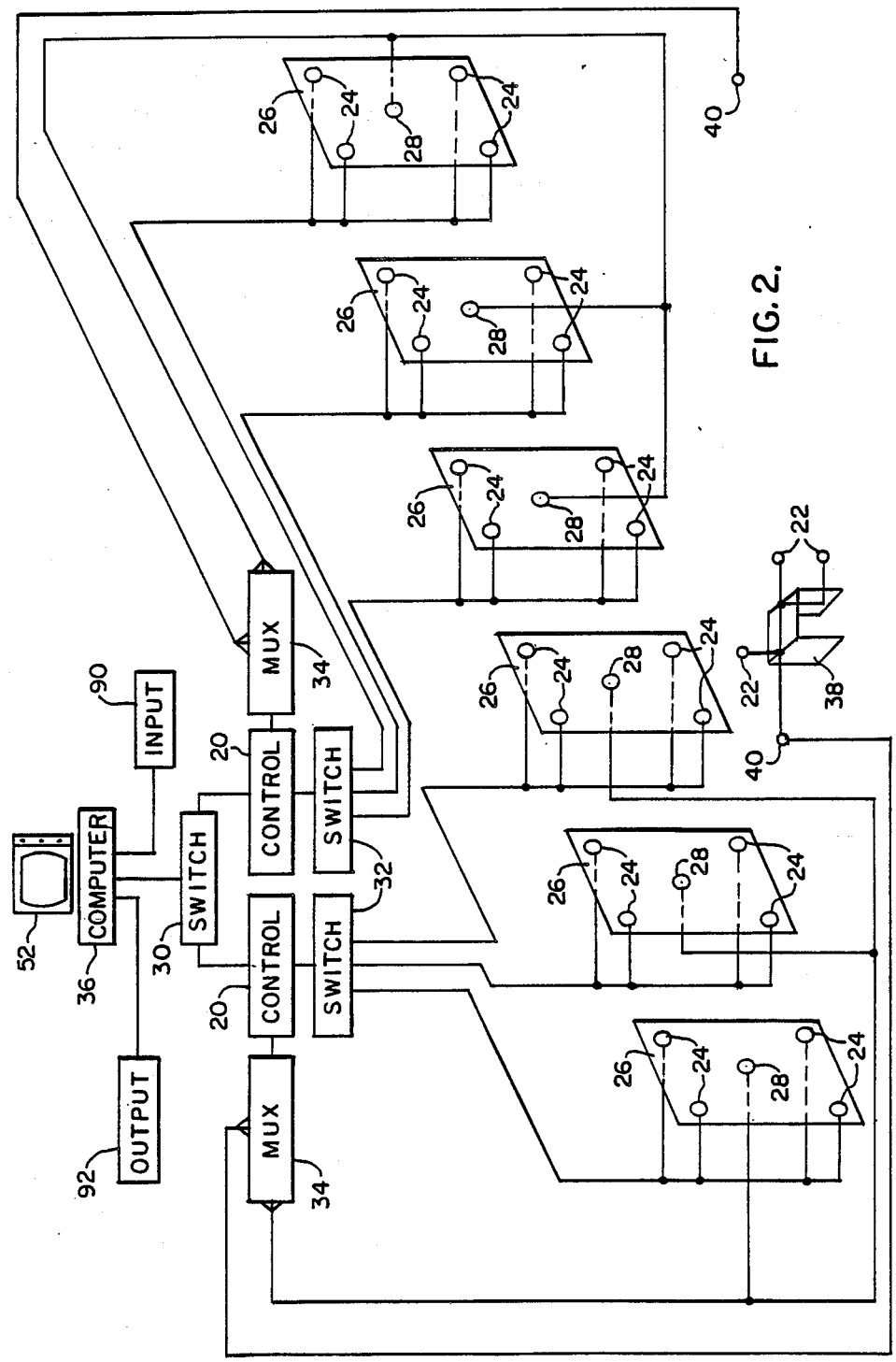
FIG. 2 is a block diagram of an embodiment of the invention.

A schematic diagram of a system for measuring a stator half coil 11 with a substantially straight center section 16 and curved end sections 10 is illustrated in FIG. 2. Preferably, the present invention utilizes a sonic digitizer, such as Model GP-8-3D from Scientific Accessories Corporation of Southport, Conn. to obtain the location of points in space. Alternatively, a laser measurement system can be used if more precise measurements are required. The Model GP-8-3D has an accuracy of 0.01 cm (0.005 inch) and thus is able to provide sufficient accuracy for measuring stator half coils.

A sonic digitizer, like the Model GP-8-3D, uses a control unit 20 to control the generation of sparks by sparkers, e.g., Model LS-3DS, which act as sound emitters 22 and to time the receipt of the sounds generated by the sound emitters (sparkers) 22 at microphones 24. There are preferably four microphones 24, arranged in a bank 26 defining a rectangle as illustrated in FIG. 2, which receive the sounds produced by the sparkers 22. A calibration sparker 28 is controlled by the control unit 20 to periodically emit a sound from a fixed location so that the control unit 20 can compensate for the effects of changes in temperature and humidity on the speed of sound.

The GP-8-3D sonic digitizer is limited to detecting sound in a cube having an edge length of nine feet. Since stator half coils 11 may be 36 feet long, more than one bank 26 of microphones 24 are required to measure a stator half coil 11. Therefore, in the preferred embodiment, several, e.g., six banks 26 of microphones 24 are arranged on a single plane and a pair of the control units 20 are supplemented by switches 30, 32 and multiplexers 34. The switch 30 is controlled by a computing apparatus 36, or manually, to select between the control units 20. Switches 32 are controlled so that the microphone banks 26 are sequentially activated one at a time. The multiplexers 34 output signals from the selected control unit 20 to the sound emitters 22, 28 in response to signals from the computing system 36.

The sound emitters 22 are mounted on a sound emitter assembly 38 which is moved along the stator half coil 11 or other object to be measured, from one emission point to another. At an emission point, the sound emitters 22 receive a signal from the multiplexer 34 and control unit 20 to generate sparks which cause sounds to be emitted by the sound emitters 22, one sound emitter 22 at a time in a predetermined sequence. The microphones 24 within the cube containing the sound emitter assembly 38 are activated by switch 32 prior to emission of the sounds by the sound emitters 22. The control unit 20 is able to detect the differences in the periods of time between emission of the sounds by the sound emitters 22 and receipt of the sounds by the microphones 24 in the one of the microphone banks 26 activated by the control unit 20 (or computing system 36 or manually) via switch 32. Due to limitations in cabling length, jacks 40 are provided for coupling the sound emitter assembly 38 for use with the banks 26 of microphones 24 connected to each of the control units 20.

Figure 4:
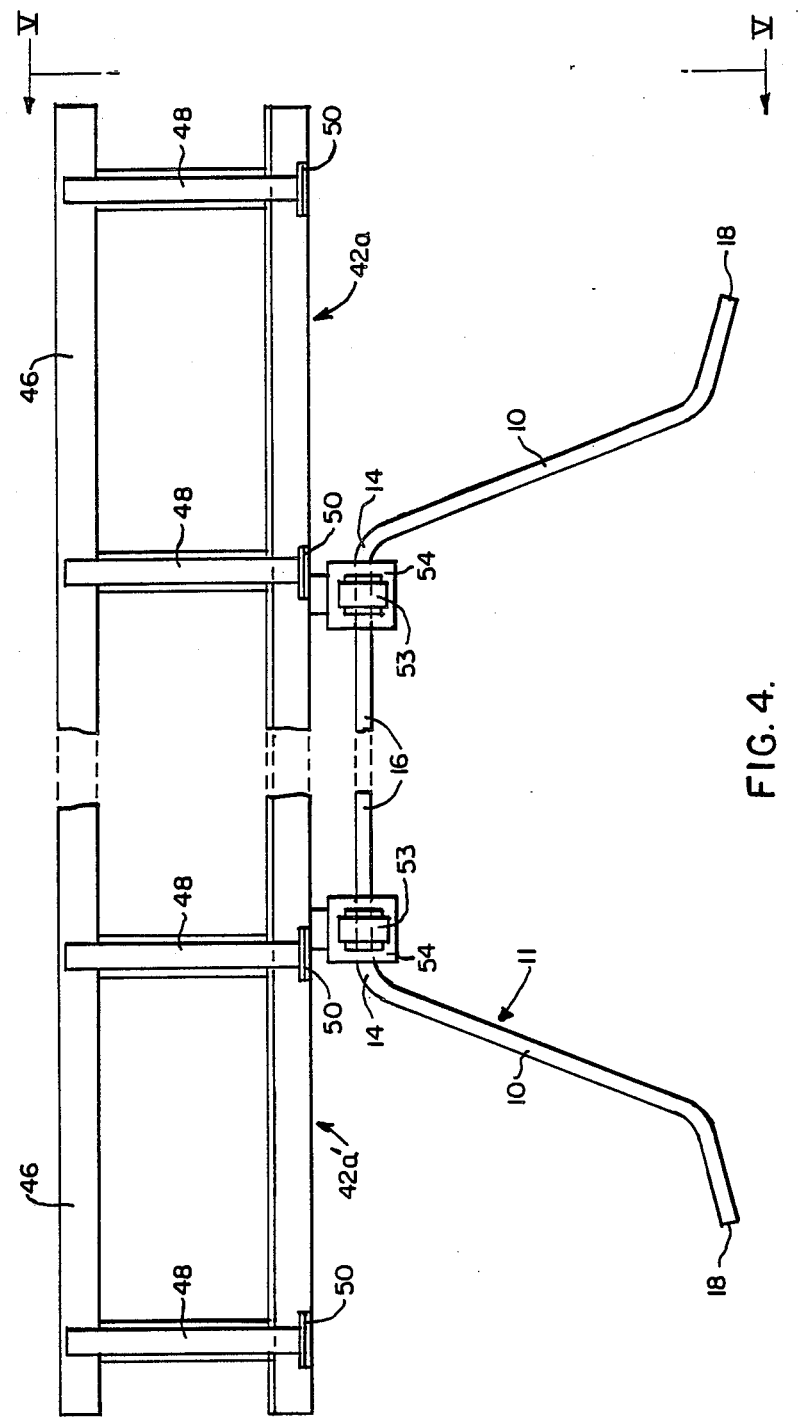
FIG. 4 is a top view of the support structure illustrated in FIG. 3, supporting a stator half coil.
Figure 5:
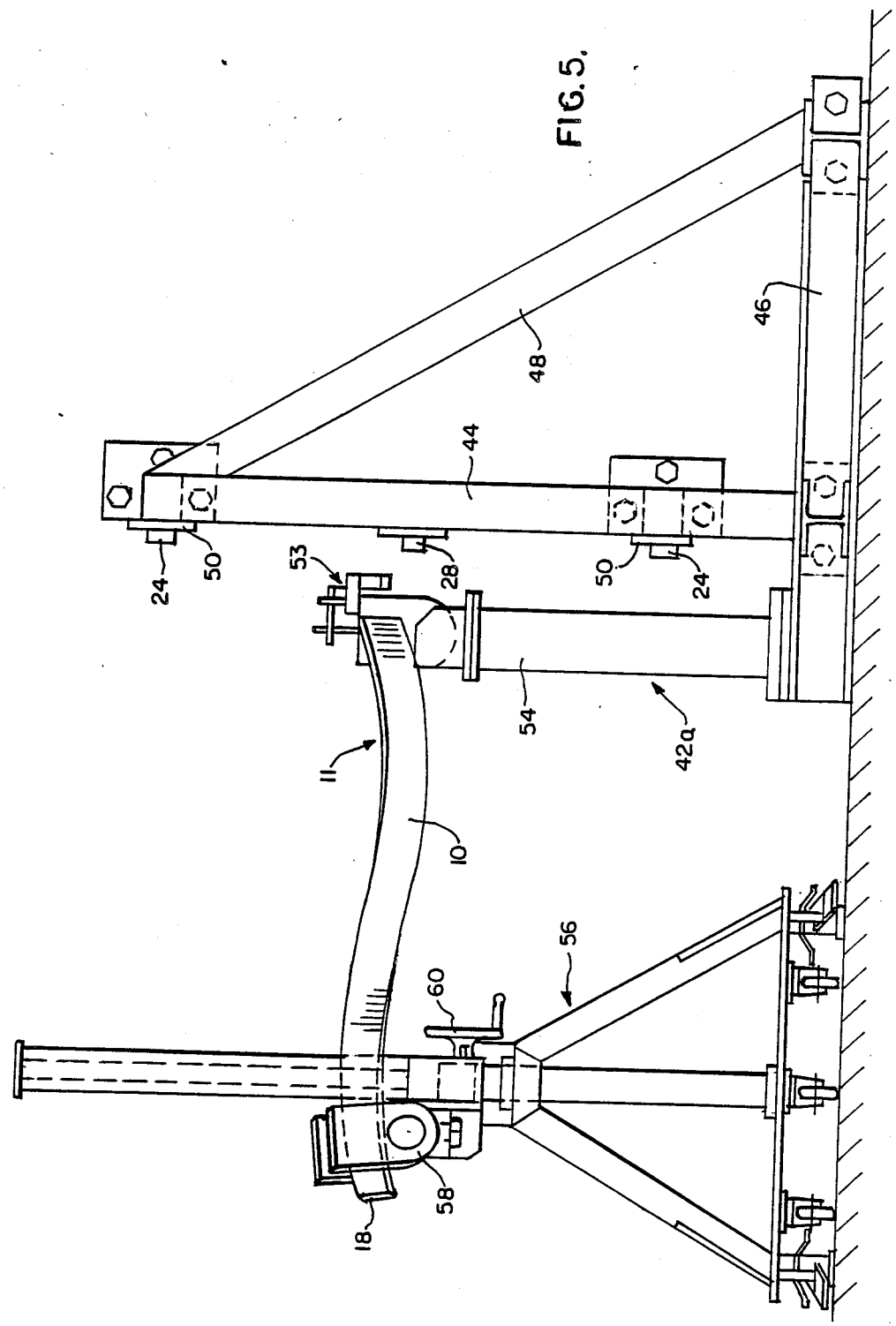
FIG. 5 is an end view of the supporting structure illustrated in FIGS. 3 and 4 including a mobile support.

The microphones 24 are supported by a support structure 42a, 42b as illustrated in FIGS. 3–5. The support structure is preferably continuous and only selected portions of the support structure 42a, 42b are illustrated in FIGS. 3 and 4. In the preferred embodiment, the support structure 42a, 42b comprises a triangular truss as best illustrated in the end view provided in FIG. 5. The truss is formed of vertical struts 44, horizontal struts 46 and diagonal struts 48. Mounting surfaces 50 are provided for mounting the microphones 24 and are preferably aligned on a single plane to simplify the calculations which are necessary to combine measurements made by two different banks 26 of microphones 24.

The portions 42a and 42a' of the support structure which are illustrated in FIGS. 3–5, are the ends of the support structure 42a, 42b, while portion 42b corresponds to the bank 26c third from the left in FIG. 2. As indicated by the braces at the bottom of FIG. 3, the microphones 24 in banks 26 define overlapping rectangles so that measurements can be made of a single point by two adjacent banks 26 of microphones 24. To further clarify how the banks overlap, each bank 26 of the microphones 24 and the sparker 28 associated therewith is separately identified in FIGS. 2–4 with a lower case letter, e.g., 26a, 26b, and the microphones 24 are individually number, e.g., 24c1, 24c2, 24c3 and 24c 4, starting in the upper left corner of the front view in FIG. 3 and proceeding clockwise.

Preferably, the sound emitter assembly 38 is moved to a common position, approximately equidistant from two overlapping rectangles, e.g., bank 26e and 26f (FIG. 3), defined by eight of the microphones 24, while the microphones 24e1–24e4 defining one 26e of the two overlapping banks are activated and then activating the microphone 24f1–24e4 defining the other 26f of the two overlapping banks and generating the sounds again at the common position. The measurements made by the two banks 26c, 26f of microphones 24 are supplied by the control unit 20 to the computing apparatus 36.

The computing apparatus 36 (FIG. 2) is programmed to convert the measurements made by the control units 20 of the emission points, including the common point and the calibration emission point 28, into corresponding surface points on the object at a known distance from the emission points. The distance between the emission and surface points is kept substantially constant by the sound emitter assembly 38 as described later. The surface points are combined by the computing apparatus 36 to define a measured shape. According to the present invention, a representation of the measured shape is displayed on a display unit 52 simultaneously with a representation of the designed shape of the stator half coil 11 or other object. Preferably, the designed and measured shapes are overlayed, one on top of the other, to aid in visually comparing the designed and measured shapes of the object. For this reason, the display unit 52 is preferably a color display unit so that the measured and displayed shapes can be displayed in different colors. Also, the computing apparatus 36 preferably includes CAD/CAM capability to more precisely measure variations between the designed and measured shapes using graphical measuring software.

Figure 1:
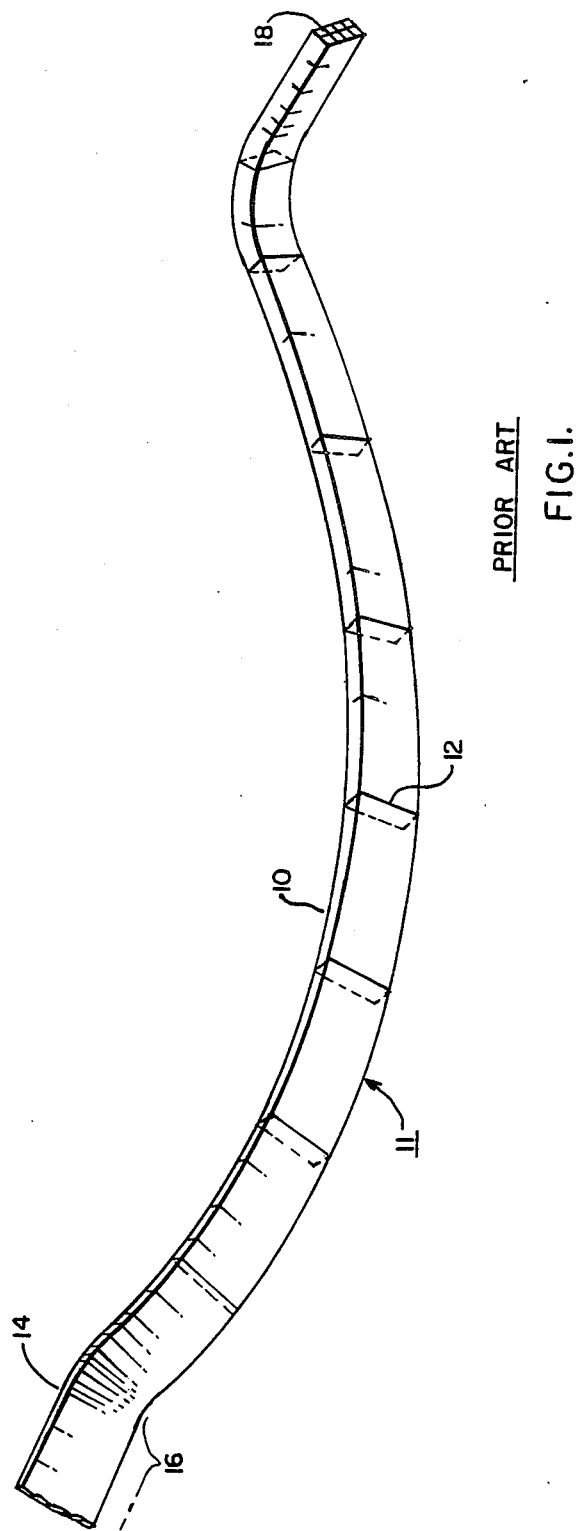
FIG. 1 is a perspective view of a conventional curved section of a stator half coil.

In the preferred embodiment, the surface points calculated by the computing apparatus 36 from the emission points measured by the control units 20 are connected as edges of the object and the display unit 52 displays at least two and preferably four edges of the object in each of the designed and measured shapes. As illustrated in FIGS. 1, 4 and 5, a stator half coil 11 is essentially an elongated prism which has been bent at the ends 10. Like all prisms, a stator half coil 11 has a polygonal cross-section of substantially consistent size. The cross-section of a stator half coil 11 is typically rectangular. Thus, four edges of the designed and measured shapes of the object can be displayed on the display unit 52.

As noted in the description of a typical stator half coil 11 with reference to FIG. 1, the majority of the length of a stator half coil 11 is taken up by the straight center section 16. Ordinarily, during manufacturing the center section 16 of a stator half coil 11 is not bent and therefore, it is unnecessary to provide a bank 26 of microphones 24 for measuring the center section 16. Thus, as indicated in portion 42b of the support structure illustrated in FIG. 3, the banks 26c, 26c closest to the center of the supporting structure 42a, 42b need not overlap each other. As a result, there are two microphones 24c1, 24b2 and 24c4, 24b3 on each of the mounting surfaces 50 at the far left end of FIG. 3, but the mounting surfaces 50 to their right are each used by only a single microphone 24c2 and 24c3 to define the bank 26c fully illustrated in portion 42b. There is no bank 26 of microphones 24 to the right of the bank, 26c illustrated in portion 42b, because the center section 16 of the stator half coil 11 can be assumed to be straight and merely the ends 14 of the center section 16 need to be measured. The computing apparatus 36 can extrapolate between the object surface points calculated for the ends 14 of the straight section 16, illustrated in FIG. 1. Similarly, there is only one microphone 24f2 and 24f3 on each of the mounting surfaces 50 at the far right end of portion 42a in FIG. 3.

By providing two sets of three overlapping banks 26 of microphones as illustrated in FIG. 2, a stator half coil 11 of any length can be measured. Assuming the microphones in each bank are spaced approximately eight feet apart (close to the maximum permitted with Model GP-8-3D), the entire length of a stator half coil 11 of less than approximately 24 feet can be measured by one of the sets of three overlapping banks 26. Longer stator half coils 11 can be supported at the center of the supporting structure 42a, 42b, with the center section 16 extending across the unmeasured region between the banks 26 closest to the center of the supporting structure 42a, 42b.

Although any object that is no more than eight feet high, eight feet wide and 24 feet long can be measured by a set of three banks 26, the preferred embodiment is designed for measuring stator half coils 11. Therefore, as illustrated in FIGS. 4 and 5, center brackets 53 on coil support pillars 54 are provided to support the center section 16 of the stator half coil 11. As illustrated in FIG. 5, roll around supports 56 are provided for supporting the ends 18 of the stator half coil 11. The roll around supports 56 are not illustrated in FIGS. 3 and 4 to provide an unobstructed view of the support structure 42a, 42b and stator half coil 11. The roll around support 56 includes an end bracket 58 for supporting the end 18 of the stator half coil 11. The end bracket 58 includes a load cell for measuring the weight supported by the roll around support 56. Preferably, the end bracket 58 is adjusted by a crank 60 until the load cell measures, e.g., 6.8 kg (15 lbs.). This provides repeatability of the measurements by steadying the stator half coil 11 during measurement so that vibration or other forces exerted on the stator half coil 11 do not cause undesirable fluctuations in the path of the sound emitter assembly 38.

As described above, the sound emitter assembly 38 is moved along the surface of the curved end section 10 of the stator half coil or other object to be measured and sound is emitted at a number of emission points which are converted to surface points defining a measured shape of the object. In order for the computing apparatus 36 to calculate the relative positions of the object surface points in dependence upon periods of time between emission of the sounds by the sound emitters 22 and receipt of the sounds by one of the microphone banks 26, it is necessary for the computing apparatus 36 to know the distance between the sound emitters 22 and the surface of the object.

Figure 6:
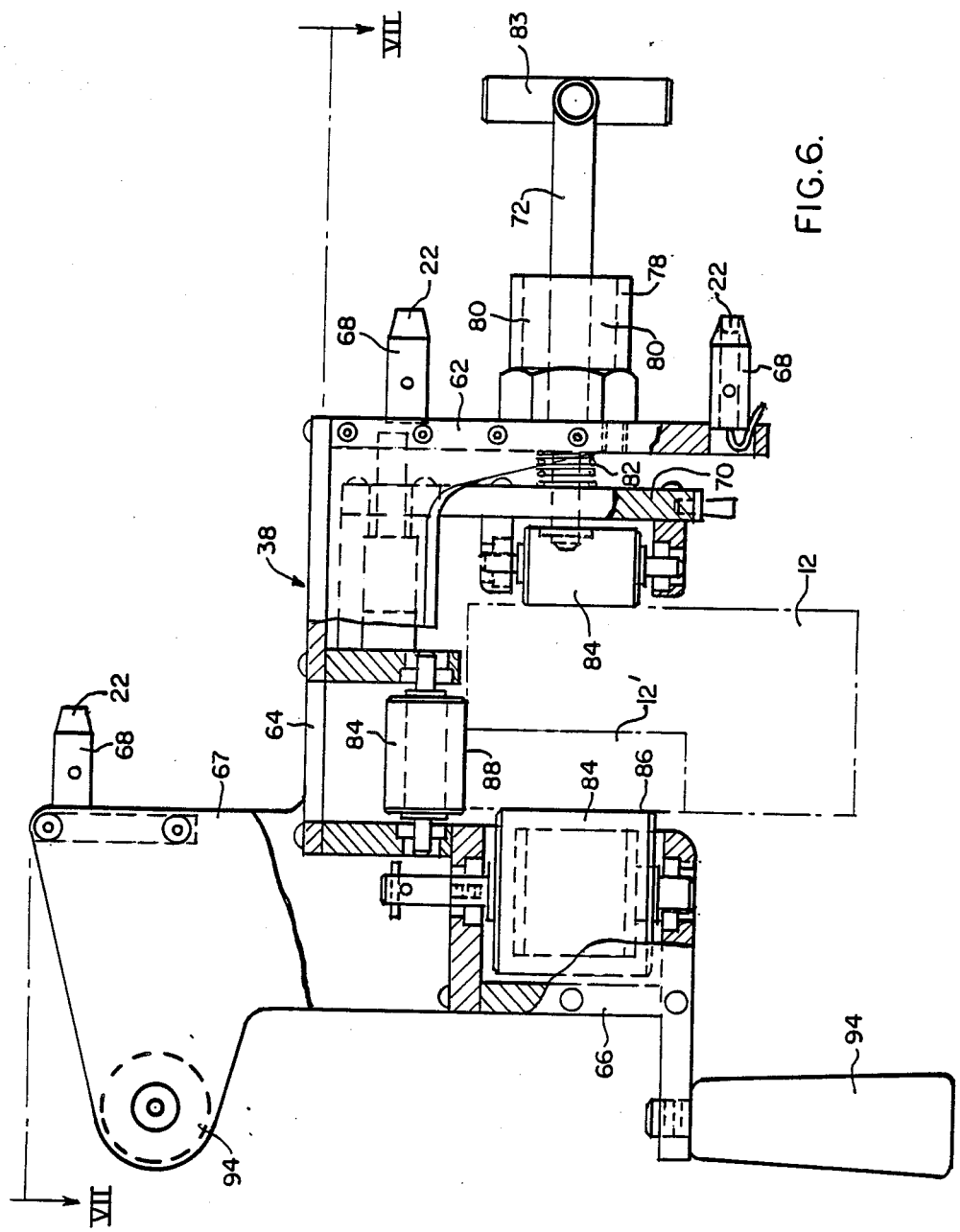

In the preferred embodiment, this is accomplished by using a sound emitter assembly 38, such as that illustrated in FIGS. 6 and 7. As schematically illustrated in FIG. 2 and structurally illustrated in the side view of FIG. 6, the sound emitter assembly 38 is preferably a three-sided rectangular channel formed by sides 62, 64 and 66. The sound emitters (sparkers) 22 are mounted in a vertical plane on first side 62 and handle bracket 67 in cylinders 68. Stator half coils 11 have cross sections of varying sizes as indicated by cross sections 12 and 12' in FIG. 6. Therefore, an adjustable plate 70 is attached to a plate adjustment shaft 72 which is secured by pegs 74 which fit in slots 76, 80 in securing chamber 78 attached to first side 62. In the top view of FIG. 7, radial slots 76 are illustrated in cross-section, while in the front view of FIG. 6, axial slots 80 are indicated in the securing chamber 78 by dashed lines. A spring 82 couples the securing shaft 72 to the plate 70 so that stator half coils 11 of widths between those corresponding to the slots 76 can be accommodated. As shown in FIG. 7 the securing shaft 72 is locked in place after putting tension on the spring 82 by twisting handle 83 to place pins 74 in a horizontal position in radial slots 76. Of course other means, such as threading the securing chamber 78 and shaft 70 and adding a lock nut or other locking means could also be used.

Preferably, rollers 84 are mounted inside the three-sided rectangular channel 62, 64, 66 on the plate 70 and sides 64 and 66. As best illustrated in FIG. 7, the preferred embodiment uses five rollers 84, two of which are mounted on the plate 70, two on the second side 64 and one on the third side 66. The rollers 84 preferably have an outer surface with a hardness of 70A durometer, which is provided by, e.g., polyurethane materials such as Duro 70A available from Parkway Products, Inc. in Cincinatti, Ohio. The rollers 84 contact three of the four sides of the stator half coil and the adjustable plate 70 is positioned so that the roller 84, mounted on the third side 66, is held against side 86 of the stator coil 11 and the rollers 84, mounted on the second side 64, are held against side 88 of the stator half coil 11 by the weight of the sound emitter assembly 38. As described above, stator half coils are wrapped with tape which results in some irregularity in the surfaces. By using rollers with the surface hardness of between 50A and 70A durometer, the rollers 84 are able to smooth perturbations of the sound emitter means caused by the irregular surfaces.

To begin measurement of a stator half coil 11, the sound emitter assembly 38 is positioned on a stator half coil 11 having a cross-section 12 as illustrated in FIG. 6 with the securing shaft 72 secured by the securing chamber 80 so that there is a predetermined amount of spring tension in spring 82. After the securing shaft 72 has been adjusted in this manner, precise measurements of the distance between the surfaces 86, 88 and the sound emitters 22 may be made, e.g., by an optical measurement system using lasers (not shown), when the sound emitter assembly 38 is used for the first time or if there is any reason to believe the measurements may have changed, e.g., due to wear in the rollers 84. The measurements between the sound emitters 22 and the surfaces of the stator half coil 11, together with the designed shape, including the measurements of cross-section 12, are input into the computing system 36 by an input unit 90 (FIG. 2), such as a keyboard or digitizer tablet. The results of the measurement may be output in addition to the display unit 52 to an output unit 92 such as a pen plotter, a CAD/CAM system or to a remote monitor or computer system.

Once the distances between the sound emitters 22 and sides 86 and 88 of the stator half coil 11 are known, measurement of the relative positions of object surface points can begin. The sound emitter assembly 38 is moved along the stator half coil 11 by the use of handles 94 or by providing a motor (not shown) for driving one or more of the rollers 84, such as the roller 84 mounted on side 66. In response to a timer or a manually triggered switch, the control unit 20 sends signals to four sparkers, sparkers 22 on the sound assembly 38 and calibration sparker 28 in the activated bank 26, to each emit a sound, resulting in four sounds a few milliseconds apart. Depending upon the accuracy which is required and the speed of movement of the sound emitter assembly 38, the sounds may be emitted while the sound assembly 38 is moving or the assembly 38 may be stopped while the sounds are produced. The number of times that sounds are produced will depend upon how precisely measured a shape is desired. The banks 26 are sequentially activated as the sound emitter assembly 38 is moved from one emission point to another so that the rectangle defined by the activated one of the banks 26 of the microphones 24 contains an intersection point lying on a line perpendicular to the single plane of the mounting surfaces 50 and passing through a corresponding emission point at which the sound emitter apparatus 38 is positioned.

If greater precision is desired than that provided by a sonic digitizer, a three-dimensional optical measurement system can be used, together with the computing apparatus 36 and display unit 52 so that a precisely measured shape of the object can be overlayed on the designed shape for comparison visually and by the computing apparatus 36 operating as a CAD/CAM system. Depending upon the constraints of the optical system used, it may be possible to reduce the number of banks of receptors and the structure of the assembly 38 may be modified to accommodate the optical measuring system.

The many features and advantages of the present invention are apparent from the detailed specification and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. For example, the sound emitter assembly 38 is shaped to match the shape of stator coils. A differently shaped sound emitter assembly could be used to measure other objects. Accordingly, all suitable modifications and equivalents may be resorted to falling within the scope and spirit of the invention.

What is claimed is:

1. A method for measuring an object in three dimensions, comprising the steps of:
   (a) arranging microphones in banks on a single plane;
   (b) emitting sounds from different emission points corresponding to surface points on the object, each of the emission points being a known distance from a surface of the object;
   (c) activating one of the banks of the microphones at a time;
   (d) determining when the sounds are emitted at each of the emission points; and
   (e) calculating relative positions of the surface points on the object in dependence upon periods of time between said emitting of the sounds in step (b) and receipt of the sounds by the bank of the microphones activated in step (c).

2. A method as recited in claim 1,
   wherein step (a) comprises arranging the microphones in banks of at least three microphones, each bank of microphones defining a rectangle and each of the rectangles overlapping at least one other of the rectangles,
   wherein step (b) comprises the steps of:
   (bi) moving a sound emitter from one of the emission points to another; and
   (bii) emitting sounds at each of the emission points, and
   wherein step (c) comprises activating one of the banks of the microphones when the sounds are emitted from a corresponding emission point, the rectangle defined by the activated one of the banks of the microphones containing an intersection point lying on a line perpendicular to the single plane and passing through the corresponding emission point.

3. A method as recited in claim 2, wherein the object has a designed shape, and
   wherein said method further comprises the steps of:
   (f) defining a measured shape in dependence upon the relative positions of the surface points on the object;
   (g) simultaneously displaying representations of the designed and measured shapes of the object; and
   (h) comparing the designed and measured shapes of the object visually and with graphical measuring software in a CAD/CAM system.

4. A method as recited in claim 3, wherein step (g) comprises overlaying the designed and measured shapes of the object for said comparing in step (h).

5. An apparatus for three-dimensional measurement of an object, comprising:
   microphone banks arranged on a single plane;
   sound emitter means for emitting sounds from different emission points corresponding to surface points on the object, each of the emission points being a known distance from a surface of the object; and
   control means for sequentially activating one of said microphone banks at a time, for determining when the sounds are emitted by said sound emitter means at each of the emission points and for calculating relative positions of the surface points on the object in dependence upon periods of time between emission of the sounds and receipt of the sounds by one of said microphone banks activated by said control means.

6. An apparatus as recited in claim 5, further comprising display means for simultaneously displaying a designed shape and a measure shape of the object.

7. An apparatus as recited in claim 6, wherein said display means displays the measured and designed shapes overlayed on each other.

8. An apparatus as recited in claim 7, wherein said display means comprises a color display unit, operatively connected to said control means, for displaying the measured and designed shapes in different colors.

9. An apparatus as recited in claim 8, wherein the object has a polygonal cross-section of substantially consistent size,
  wherein said sound emitter means comprises two transducers maintained at substantially consistent distances from two edges of the object, and
  wherein said color display unit displays at least the two edges of the object in each of the designed and measured shapes of the object.

10. An apparatus as recited in claim 9, wherein the object has a rectangular cross-section, and
  wherein said sound emitter means further comprises:
  a three-sided rectangular channel supporting the two sound emitters,
  a plate, adjustably secured to a first side of said three-sided rectangular channel and facing a third side of said rectangular channel; and
  rollers, mounted inside said three sided rectangular channel on said plate and the second and third sides of said three-sided rectangular channel, for contacting three of the four sides of the object.

11. An apparatus as recited in claim 10, wherein the object has irregular surfaces, and
  wherein said rollers have a surface hardness of approximately 90 durometer to smooth out perturbation of said sound emitter means caused by the irregular surfaces.

12. An apparatus as recited in claim 5, wherein said microphone banks comprise:
  a support structure having mounting surfaces aligned on a single plane; and
  microphones, mounted on the mounting surfaces and operatively connected to said control means, arranged in banks of four of said microphones at the corners of rectangles, each of the rectangles defined by said microphones overlapping at least one other of the rectangles.

13. An apparatus as recited in claim 12,
  wherein said control means comprises means for controlling generation of the sounds at a common position, approximately equidistant from two overlapping rectangles defined by eight of said microphones, while said microphones defining one of the two overlapping rectangles are activated and then activating said microphones defining the other of the two overlapping rectangles and generating the sounds again at the common position, and
  wherein said display means comprises alignment means for aligning measurements made by said microphones in the two overlapping rectangles by superposing calculated points corresponding to the sounds generated at the common position and detected by said microphones defining each of the two overlapping rectangles.

14. An apparatus as recited in claim 13, wherein the object is a stator half coil with a substantially straight center section and curved end sections, and
  wherein said microphone banks comprise two sets of banks defining overlapping rectangles, each set including end banks and central banks, both the end and central banks defining rectangles with one non-overlapping side opposite an overlapping side, whereby the curved end sections of the stator half coil are measurable by the two sets of banks of said microphones.

15. An apparatus for three-dimensional measurement of an object having a designed shape, comprising:
  three-dimensional measurement means for locating measured points corresponding to surface points on the surface of the object;
  a computing apparatus for converting the measured points into the surface points to define a measured shape of the object; and
  display means for simultaneously displaying the designed and measured shapes of the object.

16. An apparatus as recited in claim 15, wherein said display means displays the measured and design shapes overlayed on each other.

17. An apparatus as recited in claim 16, wherein said display means comprises a color display unit, operatively connected to said computing apparatus, for displaying the measured and displayed shapes in different colors.

18. An apparatus as recited in claim 17, wherein the object has a polygonal cross-section of substantially consistent size,
  wherein said three-dimensional measurement means comprises sound emitter means for emitting sounds from at least two transducers maintained at substantially consistent distances from two edges of the object, and
  wherein said color display displays at least the two edges of the object in each of the designed and measured shapes of the object.

19. An apparatus as recited in claim 15, wherein said three-dimensional measurement means comprises a sonic digitizer operatively connected to said computing apparatus.

20. An apparatus as recited in claim 19, wherein said sonic digitizer comprises:
  a support structure having mounting surfaces aligned on a single plane;
  microphones, mounted on the mounting surfaces, arranged in banks of four microphones at the corners of rectangles, each of the rectangles defined by said microphones overlapping at least one other of the rectangles;
  sound emitter means for emitting sounds from the measured points corresponding to the surface points on the surface of the object; and
  control means for sequentially activating one of the banks of said microphones during a time period.

21. An apparatus as recited in claim 15, wherein said three-dimensional measurement means comprises an optical measurement apparatus operatively connected to said computing apparatus.

22. An apparatus for three-dimensional measurement of a stator half coil with a designed shape having a substantially straight center section, curved end sections and a substantially rectangular cross-section, said apparatus comprising:
  a support structure having mounting surfaces aligned on a single plane;
  microphones, mounted on the mounting surfaces, arranged in a plurality of banks of four microphones, each of the banks of said microphones overlapping at least one other of the banks of said microphones;
  a sound emitter assembly, comprising:
    a rectangular channel having first, second and third sides;
    a plate adjustably secured to the first side of said rectangular channel and facing the third
    rollers, mounted inside said rectangular channel on said plate and the second and third sides of said rectangular channel, for contacting three of the four sides of the stator half coil; and three sparkers, mounted on said rectangular channel, for producing sparks to emit sounds at substantially consistent distances from the stator half coil;

control means for sequentially activating one of the banks of said microphones at a time, for commanding said sparkers to produce sparks at emission points and for calculating relative position of the emission points in dependence upon periods of time between emission of the sounds from said sparkers and receipt of the sounds by the one of the banks of said microphones activated by said control means;

a computing apparatus for converting the relative positions of the emission points and the substantially consistent distance between said sparkers and the stator half coil into surface points and combining the surface points into a measured shape of the stator half coil; and color display means for simultaneously displaying the designed and measured shapes of the stator half coil in different colors with the designed and measured shapes overlayed.

* * * * *